(12) United States Patent
Hamberg (10) Patent No.: US 6,842,890 B1
(45) Date of Patent: Jan. 11, 2005

(54) IMPLEMENTING A TECHNICAL SOFTWARE APPLICATION IN A MOBILE COMMUNICATION SYSTEM

(75) Inventor: Max Hamberg, Helsinki (FI)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 09/671,229

(22) Filed: Sep. 27, 2000

Related U.S. Application Data (63) Continuation of application No. PCT/FI99/00285, filed on Apr. 6, 1999.

(30) Foreign Application Priority Data

Apr. 3, 1998 (FI) .................................................. 980778

(51) Int. Cl.[7] .............................. G06F 9/44; G06F 9/46
(52) U.S. Cl. ........................ 717/100; 717/131; 718/100
(58) Field of Search ................................ 718/100, 102, 718/104, 106, 1, 101; 719/320, 327, 330, 321; 717/100, 110, 120, 121, 124, 125, 131, 132, 111; 710/11

(56) References Cited

U.S. PATENT DOCUMENTS

| | | | |
|---|---|---|---|
| 5,471,393 A | | 11/1995 | Bolger |
| 5,630,101 A | * | 5/1997 | Sieffert .......................... 710/11 |
| 5,778,375 A | | 7/1998 | Hecht |
| 5,870,460 A | | 2/1999 | Litzenberger |
| 6,208,954 B1 | * | 3/2001 | Houtchens .................... 703/16 |

FOREIGN PATENT DOCUMENTS

| | | |
|---|---|---|
| DE | 273 910 | 11/1989 |
| EP | 0 661 631 | 7/1995 |

OTHER PUBLICATIONS

Fertuck, Len. System Analysis & Design With Modern Methods. Dubuque, Iowa: Wm. C. Brown Communications, 1995.*

Software Engineering: A Practicioner's Approach. The McGraw–Hill Companies, 1997.*

Cantú, et al., *Borland C++ 3.1 Object–Oriented Programming*, Published by Bantam Books, "Modularity", pp. 47–50 (1992).

International Search Report for PCT/FI99/00285.

* cited by examiner

Primary Examiner—Meng-Al T. An
Assistant Examiner—Syed J Ali
(74) Attorney, Agent, or Firm—Squire, Sanders & Dempsey L.L.P.

(57) ABSTRACT

The procedure and system of the invention are used to implement a technical application from which all uncontrolled internal interdependencies have been eliminated. The functional assemblies contained in the application are normalized so that the input data of each functional assembly unambiguously and alone determines the output data produced by the assembly. Further, according to the invention, the elements contained in the functional assemblies are normalized so that the input data of the elements unambiguously and alone determines the output data. There may be one or more elements or functional assemblies. Further, a functional assembly may form other functional assemblies. In an embodiment of the invention, the application implemented is a part of a telephone exchange software application in which the functional assemblies and elements are of an algorithmically processing type.

24 Claims, 6 Drawing Sheets

IMPLEMENTING A TECHNICAL SOFTWARE APPLICATION IN A MOBILE COMMUNICATION SYSTEM

This application is a continuation of international application serial number PCT/FI99/00285, filed 6 Apr. 1999.

FIELD OF THE INVENTION

The present invention relates to a procedure as defined in the preamble of claim 1 and to a system as defined in the preamble of claim 11 for implementing a technical application and eliminating uncontrolled internal interdependencies within the application.

BACKGROUND OF THE INVENTION

In the design, production and management of industrial apparatus, projects, processes and software, difficulties are often caused by various uncontrolled or at least difficult-to-control internal interdependencies between different parts. In design and project management, internal interdependencies may arise e.g. when person A makes a plan Y for implementing a certain device or system. The plan Y is approved at a higher level C with certain corrections, whose implementation is delegated to person A except for a given detail, which is delegated to person B. Persons A and B are instructed to implement a solution they find best within the limitations specified by the higher level C. Thus, a change made by person B, in addition to affecting the final result, has an indirect effect on the decisions made by person A. Two interdependencies arise: 'X depends on A and B' and 'A depends on B'. Problems are encountered when C (or B) does not inform A about the changes made by B.

In the treatment of large assemblies containing a plurality of variables, C may not necessarily even remember to tell A that the latter's decisions are now also dependent on decisions made by B. Such a situation can be regarded as an interdependency that is uncontrolled or at least difficult to control. Corresponding interdependencies between variables can be found in industrial processes and computer software alike.

In software development, models of the interdependencies between algorithms and databases have been created using various service definitions and interface descriptions. In creating models of such interdependencies, extensive use has been made of the client-server paradigm: A client utilises a service provided by a server in accordance with a defined interface. For example, in a situation where a server containing uncontrolled internal interdependencies serves a number of clients, a change made in the operation of the server to satisfy a given client may produce undesirable effects on operation-provided for another client.

To eliminate interdependencies from databases, numerous methods have been developed. One of these is normalisation of databases, about which there are many theories published in literature. An appropriately normalised database does not contain any uncontrolled internal interdependencies; each relation always contains a key which specifies the data elements contained in the relation—if the key data for the relation indirectly or together with another data item determines an attribute of the relation, then the relation has to be divided into several relations. In this case, the key data for each relation unambiguously and alone determines the result data produced by the relation.

Normalisation of databases only applies to the retrieval of existing data on the basis of certain key data. For instance, the output parameter 3 for input parameters 1 and 2 in the addition operation 1+2=3 would be retrieved from a normalised database which contains the sums produced by all possible input parameters. This type of structure which covers every possible combination of input parameters would not be practical or even possible in large processes or software due to the size required for the structure, the storage space it would take up and the difficulty or its modification. On the other hand, the client-server paradigm does not reduce the problems resulting from indistinct interdependencies, nor does it answer the question of how to control them.

SUMMARY OF THE INVENTION

The object of the present invention is to create a procedure and system that will make it easier to control interdependencies between parts contained in an application. A specific object of the invention is to create a procedure and system which can be used to eliminate uncontrolled internal interdependencies between parts within a technical application.

As for the features characteristic of the procedure and system of the invention, reference is made to the claims.

Normalisation applied to databases can also be applied to the implementation of the above-mentioned technical applications. According to the invention, a normalised application and its parts do not contain any uncontrolled internal interdependencies, so the operation of the application and its parts is unambiguously predictable. When a part of an application functions unambiguously, the part can be considered as a "black box" in which given input data always produces the same output data corresponding to the input data. Furthermore, when the application consists of normalised parts, its operation is unambiguous and predictable. The strength of the invention is especially evident when changes are made in a normalised application—when a part within a normalised application in which all internal interdependencies are under control is modified, one can be sure that the change will not produce any indirect effect on some other function of the application.

An application implemented according to the invention comprises a number of parts or functional assemblies, a functional assembly comprises one or more elements and an element comprises an industrial procedure, apparatus, software solution and/or process. For input data, the application produces output data so that the output data produced in the elements by processing determine the output data of the functional assemblies. The output data of the functional assemblies further determine the output data of the application. According to the invention, the element is normalised so that the element does not contain any internal interdependencies and the input data of the element unambiguously and alone determines the output data of the element. The functional assembly determining the input data of an element comprises one or more normalised elements, which determine the output data of the functional assembly.

A functional assembly can be normalised in the same way as an element. When a normalised functional assembly is considered as a part of a larger application or another functional assembly, it appears as a "black box" whose operation is unambiguously predictable—for each input data item, there is an output data item, and the normalised functional assembly does not contain any uncontrolled internal interdependencies. It can be thought of as a normalised element for an application or another functional assembly. From normalised functional assemblies (or normalised elements), it is possible to build an application than does not contain any uncontrolled internal interdependencies.

In an embodiment of the procedure, a first set of elements according to the invention forms functional assemblies. These functional assemblies are further normalised, so they are seen by another functional assembly as normalised elements. An application according to the invention consists of one or more normalised functional assemblies, which unambiguously and alone determine the output data of the application.

Functional assemblies can be formed by making different combinations. A functional assembly may consist of one or more normalised elements according to union, projection and/or selection, where union joins two or more elements in parallel, projection selects one or more of a set of output data items produced by an element, and selection specifies the output data on the basis of the input data for the set. Further, functional assemblies can be formed by executing normalised elements in cascade, in which case the output data of one element forms the input data of another element and/or the output data of one element affects the input data of another element. Further, in the procedure of the invention, functional assemblies can be built by having elements executed conditionally, in which case, when a first normalised element produces a predetermined output, the input data for a second normalised element is determined, otherwise no input data for the second element is determined. Further, in the procedure of the invention, functional assemblies can be built by having elements executed repeatedly, in which case the number of repeated executions of a first element is determined by the output data of a second element.

The application in the procedure may be e.g. a telephone exchange software application, where a telephone number supplied as input data by a client produces a connected call as output data.

The system of the invention comprises means for implementing an application and for normalisation of the application. The means comprised in the system normalise the elements in the application so that the elements contain no uncontrolled internal interdependencies. From the elements, the means of the system form functional assemblies, which are also normalised. The means of the system treat normalised functional assemblies like normalised elements. Proceeding in this manner, by normalising functional assemblies and combining normalised functional assemblies, the system creates an application which consists of one or more normalised functional assemblies. The finished application does not contain any uncontrolled internal interdependencies and the normalised functional assemblies forming it unambiguously and alone determine the output data of the application.

The system of the invention forms the functional assemblies from one or more normalised elements (or normalised functional assemblies) according to union, projection or selection, where union joins two or more elements in parallel, projection selects one or more of a set of output data items produced by an element, and selection specifies the output data on the basis of the input data for the set. Further, the system comprises means for forming functional assemblies from one or more normalised elements so that the elements can be executed in cascade, in which case the output data of one element forms the input data of another element and/or the output data of one element affects the input data of another element. Further, the system comprises means for forming a functional assembly from one or more normalised elements so that the elements can be executed conditionally, in which case, when a second normalised element produces a predetermined output, the input data for a first normalised element is determined, otherwise no input data for the first element is determined. Further, the system comprises means for forming a functional assembly from one or more normalised elements so that the elements can be executed repeatedly, in which case the number of repeated executions of a first element is determined by the output data of a second element.

BRIEF DESCRIPTION OF DRAWINGS

In the following, the invention will be described in detail by the aid of a few examples of its embodiments, wherein.

DETAILED DESCRIPTION OF THE INVENTION

Figure 1A:
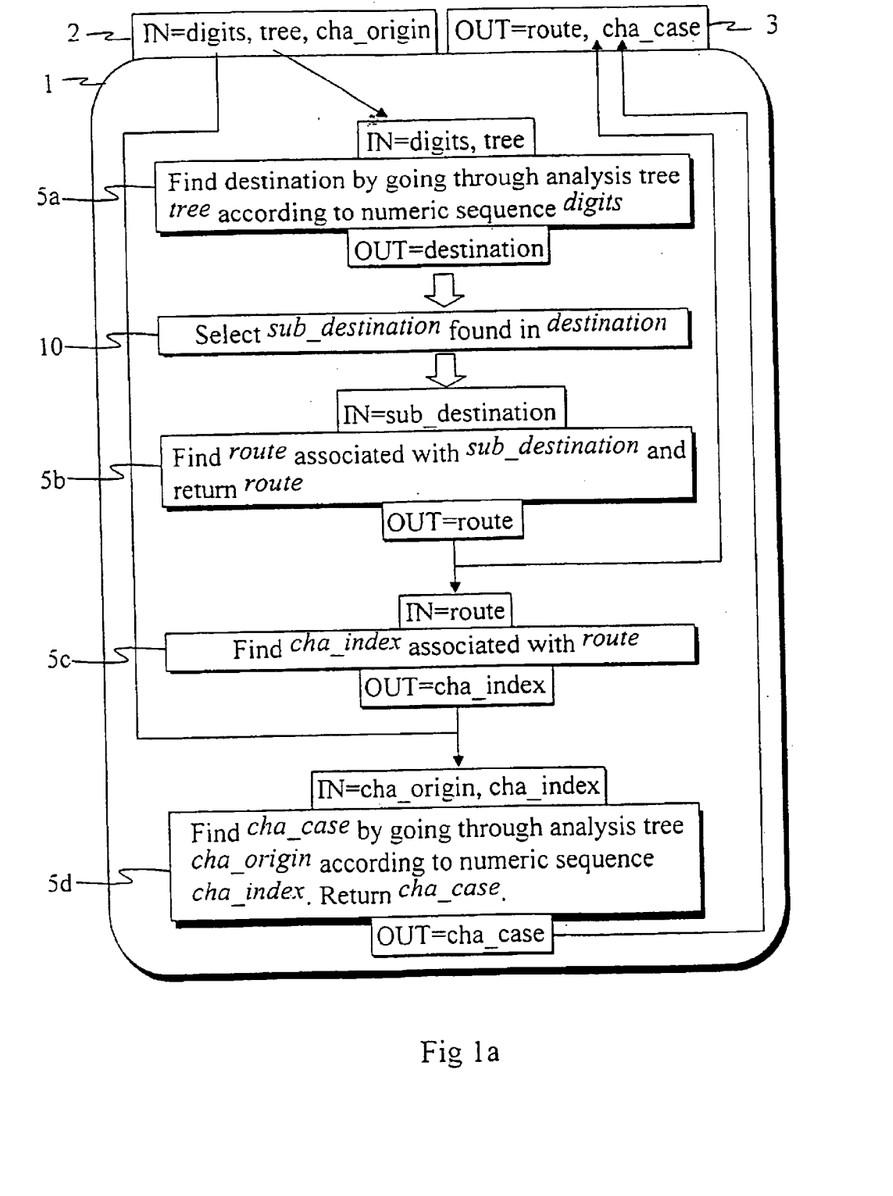
FIG. 1 illustrates the normalisation of an application.

FIG. 1a represents an application 1 (route_and_ charging_analysis) in a mobile communication system. The application receives input data 2 (digits, tree and cha_ origin) and performs a search with this data, producing output data 3 (route and cha_case). The application 1 comprises elements 5a, 5b, 5c and 5d.

Figure 1B:
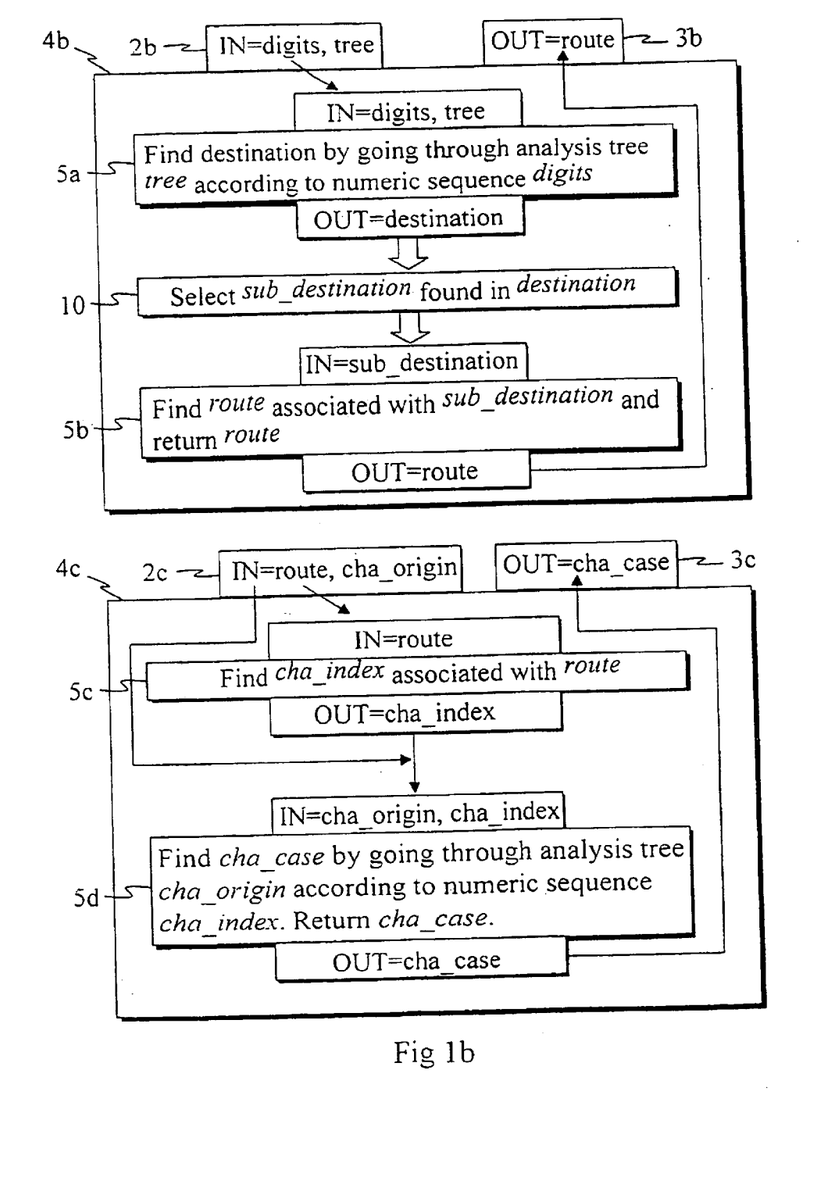

FIG. 1b presents the application 1 in FIG. 1a as normalised functional assemblies 4b and 4c, where functional assembly 4b performs a search with input data 2b (digits, tree), producing output data 3b (route), and functional assembly 4c performs a search with input data 2c (route, cha_origin) producing output data 3c (cha_case). Functional assembly 4b consists of elements 5a and 5b and selection 10. Functional assembly 4c consists of elements 5c and 5d.

Figure 1C:
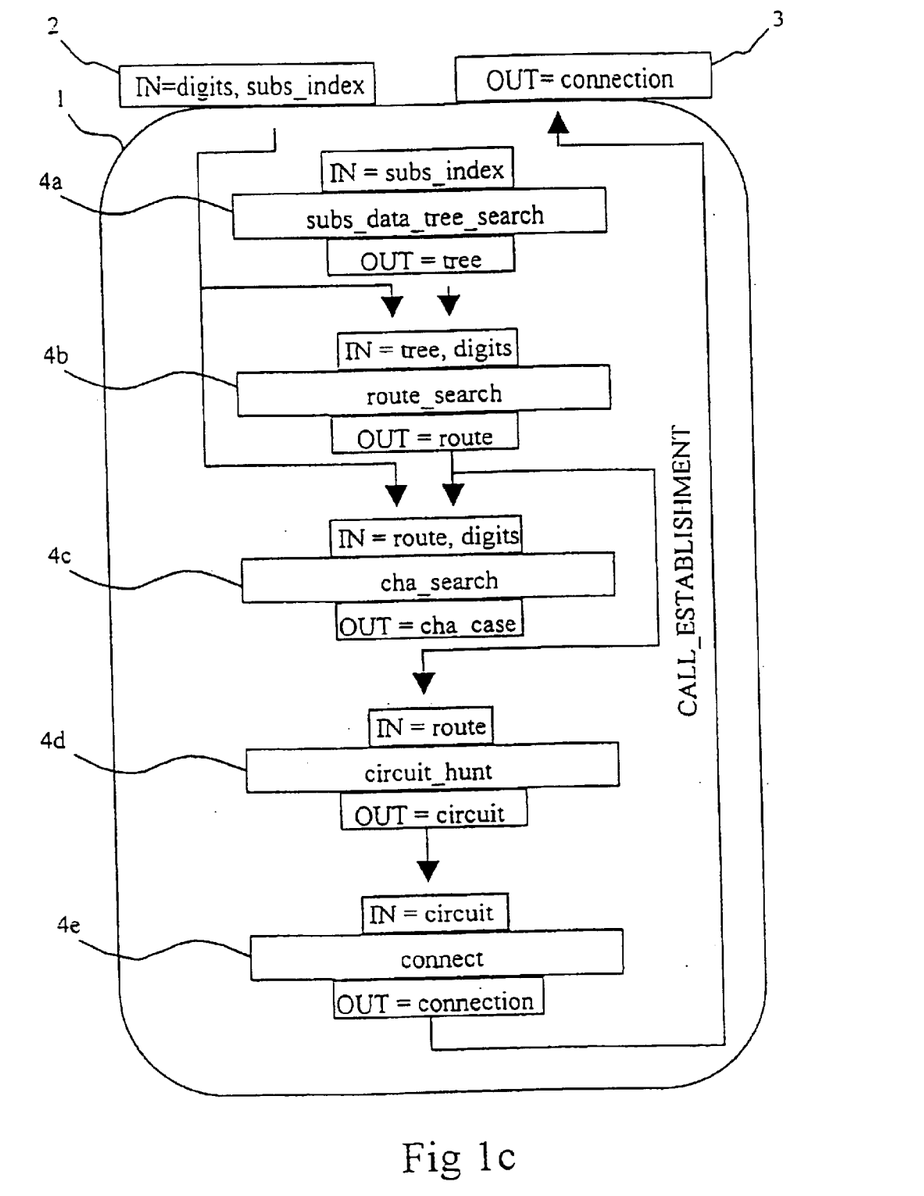

In FIG. 1c, an application 1 has been formed which uses input data 2 (digits, subs_index) to establish a call, i.e. to produce output data 3 (connection). The application 1 consists of normalised functional assemblies 4a, 4b, 4c, 4d and 4e, where functional assemblies 4b and 4c are the normalised functional assemblies presented in FIG. 1b.

In the example in FIG. 1a, we can find the following interdependencies

Route depends on digits and tree; and

Cha_case depends on cha_origin and route.

An interdependency becomes a problem if e.g. the mechanism used to select route is altered, because this also changes the mechanism selecting cha_case. The change is invisible to the user of the service, although it is obvious in the present example. FIG. 1b presents a corresponding service in normalised form. The output data 3 returned by each normalised functional assembly 4b and 4c is unambiguously determined on the basis of the input data 2.

Figure 2:
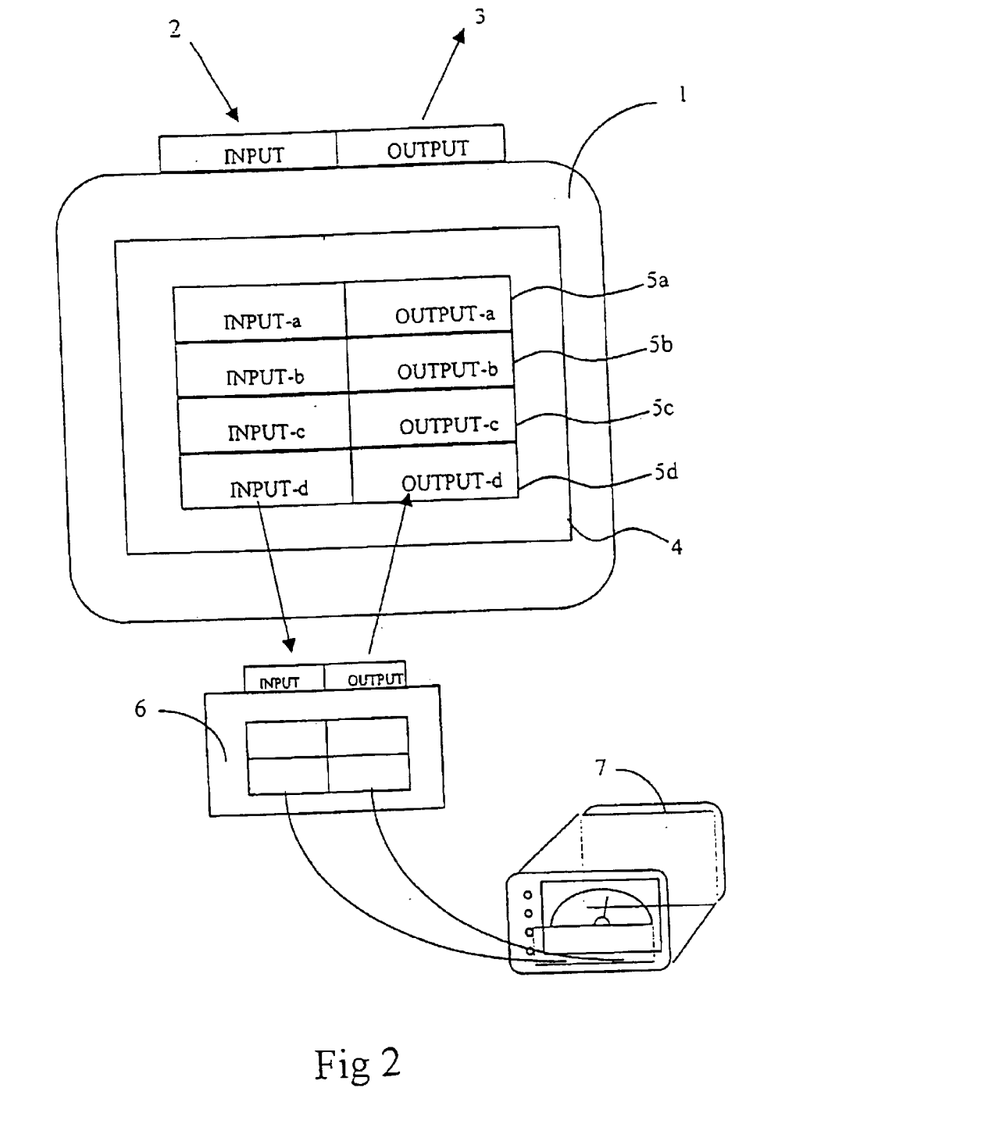
FIG. 2 presents an application consisting of normalised elements and functional assemblies formed from them.

The application 1 in FIG. 2 receives input data 2, from which it processes output data 3. The application 1 contains a normalised functional assembly 4, which consists of four normalised elements 5a, 5b, 5c, 5d. The normalised functional assembly is also an element, so in this case normalised functional assembly 4 is an element to application 1. Further, functional assembly 4 sees the application 1 as a functional assembly. Element 5d is a normalised functional assembly which consists of normalised functional assembly (i.e. element) 6. Normalised functional assembly 6 may further consist of one or more normalised functional assemblies 7. In this way, it is possible to build an application (1) from which uncontrolled internal interdependencies have been eliminated. The search required to produce the output data 3 of the application 1 is not performed as a database search, but the output data is produced via algorithmic processing. In search for the output data 3, the input data 1 is chopped into parts and distributed further to normalised functional assembly 4. The essential point is that the input data 2 is divided into parts that are so small that the input data supplied to the elements 5a–5c will unambiguously determine their output data. The input data for element 5d is further chopped in functional assemblies 6 and 7 until an unambiguous dependency is achieved. Functional assembly 7 may be e.g. a normalised measuring device.

Figure 3:
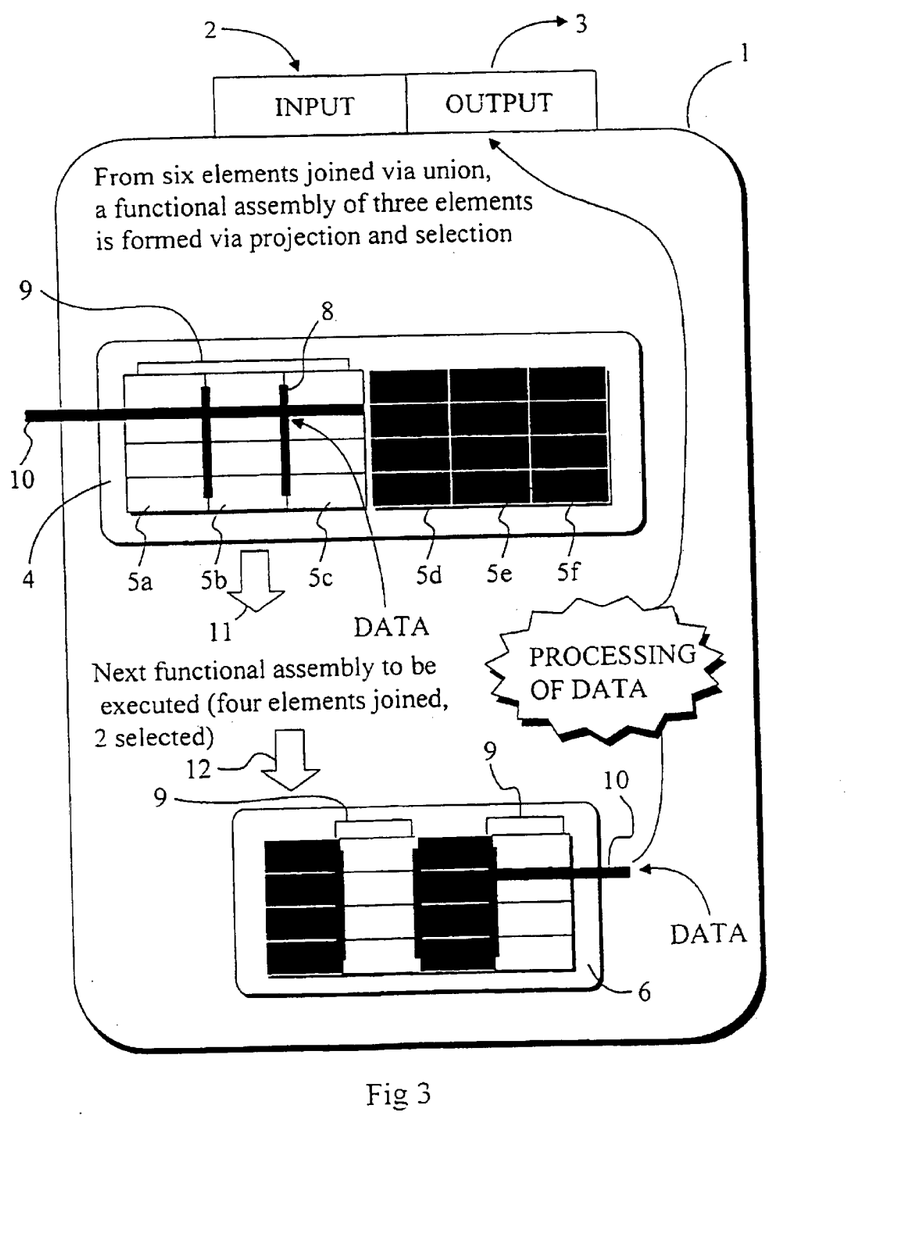
FIG. 3 illustrates certain methods of building functional assemblies according to the invention.

The application 1 in FIG. 3 receives input data 2, from which it processes output data 3. The application 1 consists of functional assemblies 4 and 6, which consist of elements 5a, 5b, 5c, 5d, 5e and 5f. Functional assembly 4 comprises six elements 5a–5f, from which, using projection 9 and selection 10, a set of three elements 5a, 5b and 5c is formed, which processes output data 11, producing the input data for functional assembly 6. Functional assembly 6 further processes the data, producing the output data 3 of the application 1. To form the application 1 from functional assemblies 4 and 6, operations as used in relational databases are utilised. The operations used are union 8, projection 9 and selection 10, where union 8 joins three elements 5a, 5b and 5c in parallel, projection 9 selects a set of elements 5a, 5b and 5c from among elements 5a–5f, and selection 10 specifies the output data 11 based on the input data 2 supplied to the set. Further, functional assemblies 4 and 6 can be executed in cascade, in which case the output data 11 of functional assembly 4 forms the input data 12 supplied to a second functional assembly 6. Cascaded execution of functional assemblies 4 and 6 may also be conditional, in which case, if predetermined output data is produced by a first functional assembly 4, then input data 12 for a second normalised functional assembly 6 is determined, otherwise no input data 12 for functional assembly 6 is determined. Execution of functional assemblies may also be repeated, in which case the output data 11 of the first functional assembly 4 determines the number of repeated executions of the second functional assembly 6.

In the database, all data has been stored beforehand, and it is there in a static form, in tables. The search for output data in the database is continued until a parameter corresponding to two input data items is found. In the procedure of the invention, no output data exists until it is searched for, and the output data searched for is produced by processing. Processing and various control flows distinguish an application implemented according to the invention from a database.

Figure 4:
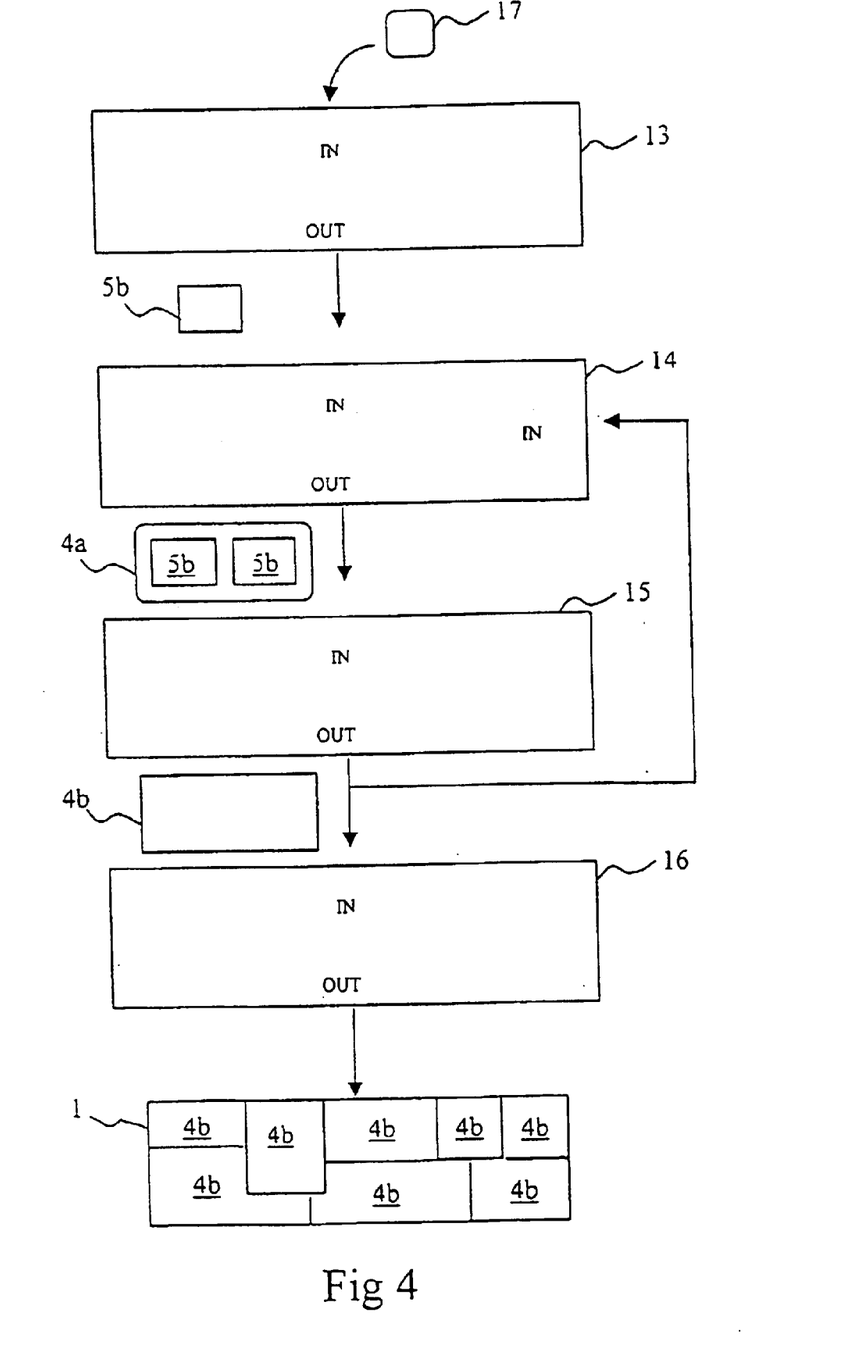
FIG. 4 represents a system according to the invention.

The system in FIG. 4 comprises means 13 for normalisation (element 5b) of element 17. Further, the system comprises means 14 for forming functional assemblies 4a from one or more normalised elements 5b. Moreover, the system comprises means 15 for normalising functional assemblies 4b and means 16 for composing an application 1 from normalised functional assemblies.

The invention is not restricted to the examples of its embodiments described above, but many variations are possible within the scope of the inventive idea defined in the claims.

What is claimed is:

1. A method of implementing an application and eliminating uncontrolled internal interdependencies within the application, with the application comprising a number of functional entities, each entity comprising one or more elements, and with the application producing application output data from input data such that element output data produced by the elements determines entity output data produced by the functional entities and the entity output data determines the application output data, wherein there are interdependencies formed between the elements, between the functional entities, or between the elements and the functional entities, said method comprising:

normalizing an element such that uncontrolled internal interdependencies within said element are eliminated, and such that the input data supplied to said element solely determines element output data produced by said element.

2. A method as recited in claim 1, wherein at least one normalized element forms a functional entity, and wherein output data of the functional entity is determined by the at least one normalized element.

3. A method as recited in claim 1, further comprising:

forming at least one functional entity from at least one normalized element; and normalizing the at least one functional entity.

4. A method as recited in claim 1, wherein the normalized element comprises a normalized functional entity.

5. A method as recited in claim 1, wherein the normalized element forms at least one normalized functional entity, and wherein the output data of the application is solely determined by the normalized functional entity.

6. A method as recited in claim 1, wherein said normalized element forms at least one normalized functional entity, and wherein the at least one normalized functional entity is formed by joining at least two elements of said plurality of elements in parallel, as a union.

7. A method as recited in claim 1, wherein said normalized element forms at least one normalized functional entity, and wherein the at least one normalized functional entity is formed by selecting at least one item of element output data.

8. A method as recited in claim 1, wherein said normalized element forms at least one normalized functional entity, and wherein the at least one normalized functional entity is formed by specifying element output data based upon input data.

9. A method as recited in claim 1, said method further comprising the steps of:

executing a plurality of normalized elements in cascade, wherein the output data of the element affects input data of another element of the plurality of normalized elements.

10. A method as recited in claim 1, further comprising the steps of:

conditionally executing normalized elements, wherein when a second normalized element produces predetermined output data, input data for a first normalized element is determined, and wherein when the second normalized element does not produce the predetermined output data, no input data is determined for the first normalized element.

11. A method as recited in claim 1, further comprising the steps of:

repeatedly executing the normalized element, with a number of repeated executions of a first element being determined by output data of a second element.

12. A method as recited in claim 1, wherein the application is implemented as telephone exchange software in a mobile communication system.

13. A system for implementing an application and eliminating uncontrolled internal interdependencies within the application, wherein the application comprises a number of functional entities, each entity comprising one or more elements, and wherein the application produces application output data from input data such that element output data produced by the elements determines entity output data produced by the functional entities and the entity output data determines the application output data, and wherein there are interdependencies formed between the elements, between the functional entities, or between the elements and the functional entities, said system comprising:

normalizing means for normalizing one or more elements such that uncontrolled internal interdependencies within each element are eliminated, and such that the input data supplied to each element solely determines element output data produced by said element.

14. A system as recited in claim 13, further comprising:
forming means for forming a functional entity comprising at least one normalized element.

15. A system as recited in claim 14, further comprising:
normalizing means for normalizing the functional entity.

16. A system as recited in claim 15, further comprising:
normalizing means for treating the normalized functional entity as a normalized element.

17. A system as recited in claim 13, further comprising:
forming means for forming an application comprising at least one normalized functional entity, and wherein the output data of the application is solely determined by the at least one normalized functional entity.

18. A system as recited in claim 13, further comprising:
forming means for forming a functional entity from at least one normalized element, said forming means joining at least two elements of said plurality of elements in parallel, as a union.

19. A system as recited in claim 13, further comprising:
at least one normalized functional entity, and wherein the at least one normalized functional entity is formed by selecting at least one item of element output data.

20. A system as recited in claim 13, further comprising:
at least one normalized functional entity, and wherein the at least one normalized functional entity is formed by specifying element output data based upon input data.

21. A system as recited in claim 13, further comprising:
executing means for executing a plurality of normalized elements in cascade, wherein the output data of the element affects input data of another element of the plurality of normalized elements.

22. A system as recited in claim 13, further comprising:
forming means for forming a functional entity based upon at least one normalized element, wherein said at least one normalized element can be executed conditionally, and wherein when a second normalized element produces predetermined output data, input data for a first normalized element is determined, and when the second normalized element does not produce predetermined output data, no input data is determined for the first element.

23. A system as recited in claim 13, further comprising:
forming means for forming a functional entity from at least one normalized element, wherein the at least one normalized element can be executed repeatedly, with a number of repeated executions of a first element being determined by output data of a second element.

24. A system for implementing an application and eliminating uncontrolled internal interdependencies within the application, wherein the application comprises a number of functional assemblies, each assembly comprising one or more elements, and wherein the application produces application output data from input data such that element output data produced by the elements determines assembly output data produced by the functional assemblies and the assembly output data determines the application output data, and wherein there are interdependencies formed in at least one of between the elements, between the functional assemblies, and between the elements and the functional assemblies, said system comprising:

the one or more elements; and normalizing means for normalizing the one or more elements such that uncontrolled internal interdependencies within each element are eliminated, and such that the input data supplied to each element solely determines element output data produced by said element.

* * * * *